United States Patent
Bossier et al.

(10) Patent No.: US 12,442,817 B2
(45) Date of Patent: Oct. 14, 2025

(54) MEANS TO DETECT WHETHER ACUTE HEPATOPANCREATIC NECROSIS DISEASE-CAUSING VIBRIO PARAHAEMOLYTICUS IS VIRULENT OR NON-VIRULENT

(71) Applicant: Universiteit Gent, Ghent (BE)

(72) Inventors: Peter Bossier, De Pinte (BE); Vikash Kumar, Ghent (BE); Suvra Roy, Ghent (BE)

(73) Assignee: Universiteit Gent, Ghent (BE)

( * ) Notice: Subject to any disclaimer, the term of this patent is extended or adjusted under 35 U.S.C. 154(b) by 891 days.

(21) Appl. No.: 17/641,402

(22) PCT Filed: Sep. 10, 2020

(86) PCT No.: PCT/EP2020/075292
§ 371 (c)(1),
(2) Date: Mar. 8, 2022

(87) PCT Pub. No.: WO2021/048258
PCT Pub. Date: Mar. 18, 2021

(65) Prior Publication Data
US 2022/0326237 A1 Oct. 13, 2022

(30) Foreign Application Priority Data
Sep. 12, 2019 (EP) .................................. 19197064

(51) Int. Cl.
*G01N 33/569* (2006.01)
*G01N 33/573* (2006.01)
(52) U.S. Cl.
CPC ..... *G01N 33/56911* (2013.01); *G01N 33/573* (2013.01); *G01N 2333/28* (2013.01); *G01N 2333/916* (2013.01)

(58) Field of Classification Search
None
See application file for complete search history.

(56) References Cited

FOREIGN PATENT DOCUMENTS

CN          104711328 A     6/2015

OTHER PUBLICATIONS

Zaheer (Environ Microbiol 2009 11:1572-1587; see Materials and Methods) (Year: 2009).*
Harke (PLOs One 2013 8:e69834; See Materials and Methods) (Year: 2013).*
Sebastian (ISME Journal 2009 3:563-572; See Materials and Methods). (Year: 2009).*
CN109369804; English WIPO Translation (Year: 2019).*
CN 108864280 English WIPO translation (Year: 2018).*
CN 108948190 English WIPO translation (Year: 2018).*
CN106841607 WIPO English Translation (Year: 2017).*
Aranguren et al., "Enterocytozoon Hepatopenaei (EHP) is a Risk Factor for Acute Hepatopancreatic Necrosis Disease (AHPND) and Septic Hepatopancreatic Necrosis (SHPN) in the Pacific White Shrimp Penaeus Vannamei," Science Direct, vol. 471, (Mar. 2017), pp. 37-42.
Balaban "Bacterial Persistence as a Phenotypic Switch" Science; Sep. 10, 2004; 305, 5690; ProQuest, p. 1622.
Campa-Cordova et al. "Recombinant PirA-like toxin protects shrimp against challenge with Vibrio parahaemolyticus, the aetiological agent of acute hepatopancreatic necrosis disease" Journal of Fish Diseases (Nov. 2017) 40, 1725-1729.
Devadas et al., "Experimental Methodologies and Diagnostic Procedures Foracute Hepatopancreatic Necrosis Disease (AHPND)," Science Direct, vol. 499, (Jan. 15, 2019), pp. 389-400.
Dong et al. "pirABvp-Bearing Vibrio parahaemolyticus and Vibrio campbellii Pathogens Isolated from the Same AHPND-Affected Pond Possess Highly Similar Pathogenic Plasmids" Frontiers in Microbiology (Oct. 2017) vol. 8 Article 1859, pp. 1-9.
Ge et al., "Immune Response of Exopalaemon Carinicauda Infected With an AHPND-Causing Strain of Vibrio Parahaemolyticus," Science Direct, Fish & Shellfish Immunology, vol. 74, (Mar. 2018), pp. 223-234.
Han et al., "Characterization and Pathogenicity of Acute Hepatopancreatic Necrosis Disease Natural Mutants, PirAB (-) V. Parahaemolyticus, and PirAB (+) V. Campbellii Strains," Aquaculture, vol. 470, (Mar. 1, 2017), pp. 84-90.
International Search Report for International Application No. PCT/EP2020/075292, mailed Nov. 13, 2020, 5 pages.
International Written Opinion for International Application No. PCT/EP2020/075292, mailed Nov. 13, 2020, 6 pages.
Jayaraman "Phase variation and adaptation in bacteria: A 'Red Queen's Race'" Current Science, Apr. 25, 2011, vol. 100, No. 8 (Apr. 25, 2011), pp. 1163-1171.
Kumar et al. "Phloroglucinol-Mediated Hsp70 Production in Crustaceans: Protection against Vibrio parahaemolyticus in Artemia franciscana and Macrobrachium rosenbergii" Frontiers in Immunology (May 2018) vol. 9, Article 1091.
Kumar et al. "Probing the mechanism of VPAHPND extracellular proteins toxicity purified from Vibrio parahaemolyticus AHPND strain in germ-free Artemia test system" Aquaculture, vol. 504 (Apr. 2019) pp. 414-419.
Lin et al. "Structural Insights into the Cytotoxic Mechanism of Vibrio parahaemolyticus PirAvp and PirBvp Toxins" Mar. Drugs, 15, 373 (Dec. 2017) 12 pages.

(Continued)

*Primary Examiner* — Changhwa J Cheu
(74) *Attorney, Agent, or Firm* — TraskBritt (57) ABSTRACT

A method of monitoring acute hepatopancreatic necrosis disease in shrimp is disclosed. More specifically, detection of the presence of alkaline phosphatase Phox enzyme, or, of the PiRA$^{VP}$ and/or the PirB$^{VP}$ toxins of acute hepatopancreatic necrosis disease-causing *Vibrio parahaemolyticus* correlates with non-virulence or virulence, respectively, of the bacterium is disclosed. Hence, an assay capable of detecting the Phox enzyme and/or the toxins could be very useful to monitor the disease in shrimp.

7 Claims, 5 Drawing Sheets
Specification includes a Sequence Listing.

(56) References Cited

OTHER PUBLICATIONS

Rossigno et al. "Phenotypic variation in the Pseudomonas fluorescens clinical strain MFN1032" Research in Microbiology 160 (Apr. 2009) pp. 337-344.

Sirikharin et al. "Characterization and PCR Detection of Binary, Pir-Like Toxins from Vibrio parahaemolyticus Isolates that Cause Acute Hepatopancreatic Necrosis Disease (AHPND) in Shrimp" PLOS One, DOI:10.1371/journal.pone.0126987 (May 27, 2015) pp. 1-16.

Sousa et al. "Phenotypic switching: an opportunity to bacteria thrive" Science against microbial pathogens: communicating current research and technological advances, A. Mendez-Vilas (Ed.) pp. 252-262 (Jan. 2012).

Thomen et al. "Bacterial biofilm under flow: First a physical struggle to stay, then a matter of breathing" PLOS One (Apr. 12, 2017) 24 Pages.

Tinwongger et al., "Identification of an Anti-Lipopolysaccharide FactorAV-R Isoform (LvALF AV-R) Related to Vp_PirAB-Like Toxin Resistance in Litopenaeus Vannamei," Fish Shellfish Immunol., vol. 84, (2019), pp. 178-188.

Van Der Woude "Re-examining the role and random nature of phase variation" FEMS Microbiology Letters, vol. 254, Issue 2 (Jan. 2006) pp. 190-197.

Woolkalis et al. "Evolution of Alkaline Phosphatase in Marine Species of Vibrio" Journal of Bacteriology, vol. 147, No. 1, Jul. 1981) p. 36-45 (Accepted Apr. 10, 1981).

* cited by examiner

FIG. 4

SEQUENCE LISTING

```
<160> NUMBER OF SEQ ID NOS: 4

<210> SEQ ID NO 1
<211> LENGTH: 678
<212> TYPE: PRT
<213> ORGANISM: Vibrio parahaemolyticus

<400> SEQUENCE: 1

Met Ser Lys Glu Thr Phe Asp Ala Thr Arg Tyr Asn Gln Ser Asp Asn
1               5                   10                  15

Lys Pro Phe Glu Glu Val Leu Glu Ala Ser Leu Ser Arg Arg Ser Ile
            20                  25                  30

Leu Lys Gly Gly Leu Gly Ile Ser Ala Met Thr Ala Phe Gly Ala Phe
        35                  40                  45

Gly Leu Ala Gly Cys Asn Ser Ser Ser Gly Thr Ser Ala Ser Asn
    50                  55                  60

Gly Ser Gly Val Ser Lys Ala Val Leu Asn Phe Asp Ser Ile Pro Gly
65                  70                  75                  80

Ser Leu Thr Asp Ala Val Ser Ile Pro Gln Gly Tyr Thr Ala Gln Val
                85                  90                  95

Leu Val Pro Trp Gly Thr Pro Leu Asn Ala Gln Gly Ser Ala Trp Lys
            100                 105                 110
```

```
Asn Asp Gly Ser Asn Thr Ser Ser Asp Gln Leu Asn Ala Leu Gly Met
            115                 120                 125
His His Asp Gly Met His Phe Phe Pro Leu Asn Asp Ser Thr Thr Asp
130                 135                 140
Gly Leu Leu Cys Ile Asn His Glu Tyr Ile Asp Thr Ser Ala Leu His
145                 150                 155                 160
Pro Asn Gly Pro Thr Val Ala Asn Gly Val Arg Thr Ile Val Asp Glu
                165                 170                 175
Val Arg Lys Glu Ile Asn Ala His Gly Val Ser Val Val Arg Ile Gln
            180                 185                 190
Leu Glu Asp Asn Met Trp Lys Leu Val Asp Thr Asp Pro Leu Asn Arg
            195                 200                 205
Arg Tyr Thr Gly Ala Thr Val Met Asp Leu Ser Gly Pro Val Ala His
        210                 215                 220
Thr Ala Leu Thr Val Thr Arg Phe Ser Pro Asp Gly Ser Gln Ala Arg
225                 230                 235                 240
Gly Thr Leu Asn Asn Cys Gly Asn Gly Tyr Thr Pro Trp Gly Thr Tyr
                245                 250                 255
Leu Thr Cys Glu Glu Asn Trp Pro Gly Tyr Phe Val Asn Ala Gly Thr
            260                 265                 270
Arg Thr Glu Glu Gln Asp Arg Ile Gly Val Asp Asp Lys Ser Thr Arg
        275                 280                 285
Tyr Leu Trp Glu Thr Leu Ala Gly Asn Ser Glu Glu Arg Leu Asp Glu
    290                 295                 300
Phe Thr Arg Phe Asn Val Ala Pro Thr Gly Thr Ser Ser Ala Asp Asp
305                 310                 315                 320
Tyr Arg Asn Glu Ala Asn Gly His Gly Tyr Ile Val Glu Ile Asp Pro
                325                 330                 335
Tyr Thr Gln Asn Ser Arg Ala Lys Lys Arg Thr Ala Leu Gly Arg Phe
            340                 345                 350
Arg His Glu Gly Cys Ala Phe Gly Lys Leu Glu Ala Gly Lys Pro Val
        355                 360                 365
Val Phe Tyr Ser Gly His Asp Ser Arg Phe Glu Tyr Leu Tyr Lys Phe
    370                 375                 380
Glu Ser Ala Ala Ala Trp Asp Pro Ala Asp Ala Asn Pro Ala Asn Arg
385                 390                 395                 400
Leu Ala Thr Gly Asp Lys Tyr Met Asp Glu Gly Thr Leu Tyr Val Ala
                405                 410                 415
Arg Phe Asn Glu Asp Ser Thr Gly Thr Trp Leu Pro Leu Thr Leu Asp
            420                 425                 430
Ser Val Thr Thr Ser Gly Gly Thr Leu Ala Asp His Phe Asn Ser Leu
        435                 440                 445
Ala Glu Ile Ile Ile Asn Thr Ala Gly Ala Ala Asp Leu Val Gly Ala
    450                 455                 460
Thr Pro Met Asp Arg Pro Glu Trp Cys Ser Val Asp Pro Phe Thr Gly
465                 470                 475                 480
Ser Val Tyr Leu Thr Leu Thr Asn Asn Thr Arg Arg Thr Asp Glu Thr
                485                 490                 495
Asn Pro Ala Asn Pro Arg Leu Asn Lys Phe Gly His Val Ile Arg
            500                 505                 510
Trp Asp Glu Gly Thr Ser Ala Thr Asp Phe Ile Trp Asp Ile Phe Val
        515                 520                 525
Phe Gly Ser Pro Glu Asn Gly Asp Ala Asp Thr Asn Arg Ser Gly Leu
```

```
                     530                 535                 540
Asn Glu Leu Asn Gln Phe Ala Ser Pro Asp Gly Leu Ala Phe Asp Gly
545                 550                 555                 560

Arg Gly Ile Leu Trp Ile Gln Thr Asp Asn Gly Ala Asp Glu Val Thr
                565                 570                 575

Ser Tyr Thr Asn Asp Gln Met Leu Ala Val Val Pro Ser Lys Leu Thr
            580                 585                 590

Asn Glu Asn Gly Asp Gln Ala Val Ile Gly Ala Asp Asn Gln Ala Glu
        595                 600                 605

Leu Lys Arg Phe Phe Val Gly Pro Asn Gly Cys Glu Val Thr Gly Phe
    610                 615                 620

Thr Ile Ser Pro Asp Tyr Lys Ser Leu Phe Val Asn Ile Gln His Pro
625                 630                 635                 640

Gly Asn Trp Pro Tyr Ser Asp Asp Ala Ala Gln Glu Thr Pro Thr Gly
                645                 650                 655

Thr Thr Val Arg Pro Arg Ala Ala Thr Val Val Ile Arg Arg Glu Asp
            660                 665                 670

Gly Gly Glu Ile Ala Val
        675

<210> SEQ ID NO 2
<211> LENGTH: 111
<212> TYPE: PRT
<213> ORGANISM: Vibrio parahaemolyticus

<400> SEQUENCE: 2

Met Ser Asn Asn Ile Lys His Glu Thr Asp Tyr Ser His Asp Trp Thr
1               5                   10                  15

Val Glu Pro Asn Gly Gly Val Thr Glu Val Asp Ser Lys His Thr Pro
            20                  25                  30

Ile Ile Pro Glu Val Gly Arg Ser Val Asp Ile Glu Asn Thr Gly Arg
        35                  40                  45

Gly Glu Leu Thr Ile Gln Tyr Gln Trp Gly Ala Pro Phe Met Ala Gly
    50                  55                  60

Gly Trp Lys Val Ala Lys Ser His Val Val Gln Arg Asp Glu Thr Tyr
65                  70                  75                  80

His Leu Gln Arg Pro Asp Asn Ala Phe Tyr His Gln Arg Ile Val Val
                85                  90                  95

Ile Asn Asn Gly Ala Ser Arg Gly Phe Cys Thr Ile Tyr Tyr His
            100                 105                 110

<210> SEQ ID NO 3
<211> LENGTH: 146
<212> TYPE: PRT
<213> ORGANISM: Vibrio parahaemolyticus

<400> SEQUENCE: 3

Lys Ser Tyr Leu Phe Asp Asn Tyr Glu Val Asp Pro Asn Tyr Ala Phe
1               5                   10                  15

Lys Ile Gln Asp Leu Val Asp Glu Ser Ile Ile Asp Ala Ile Asn Gly
            20                  25                  30

Ile Leu Asp Ser Lys Asp Lys Ile Gln Asp Ile Asn Glu Thr Ile Glu
        35                  40                  45

Asn Phe Gly Tyr Ala Ala Ala Lys Asp Asp Tyr Ile Gly Leu Val Thr
    50                  55                  60

His Tyr Leu Ile Gly Leu Glu Glu Asn Phe Lys Arg Leu Thr Tyr Glu
```

```
                65                  70                  75                  80
Asn Gly Glu Val Val Glu Leu Gly Lys Tyr Val Asp Val Ile Ala Asn
                    85                  90                  95

Gly Pro Glu Ala Ile Asp Arg Ile Val Phe His Phe Ser Asp Asp Arg
                100                 105                 110

Thr Phe Val Val Gly Glu Asn Ser Gly Lys Pro Ser Val Arg Val Ala
                115                 120                 125

Ala Phe Ser Val Ala Tyr Glu Leu Phe His Pro Asp Glu Phe Gly Thr
                130                 135                 140

Glu Lys
145

<210> SEQ ID NO 4
<211> LENGTH: 289
<212> TYPE: PRT
<213> ORGANISM: Vibrio parahaemolyticus

<400> SEQUENCE: 4

Thr Ile Val Asp Glu Val Arg Lys Glu Ile Asn Ala His Gly Val Ser
1               5                   10                  15

Val Val Arg Ile Gln Leu Glu Asp Asn Met Trp Lys Leu Val Asp Thr
                20                  25                  30

Asp Pro Leu Asn Arg Arg Tyr Thr Gly Ala Thr Val Met Asp Leu Ser
                35                  40                  45

Gly Pro Val Ala His Thr Ala Leu Thr Val Thr Arg Phe Ser Pro Asp
                50                  55                  60

Gly Ser Gln Ala Arg Thr Glu Glu Gln Asp Arg Ile Gly Val Asp Asp
65                  70                  75                  80

Lys Ser Thr Arg Tyr Leu Trp Glu Thr Leu Ala Gly Asn Ser Glu Glu
                85                  90                  95

Arg Leu Asp Glu Phe Thr Arg Phe Asn Val Ala Pro Thr Gly Thr Ser
                100                 105                 110

Ser Ala Asp Asp Tyr Arg Asn Glu Ala Asn Gly His Gly Tyr Ile Val
                115                 120                 125

Glu Ile Asp Pro Tyr Thr Gln Asn Ser Arg Lys Arg Thr Ala Leu Gly
                130                 135                 140

Arg Phe Arg His Glu Gly Cys Ala Phe Gly Lys Leu Glu Ala Gly Lys
145                 150                 155                 160

Pro Val Val Phe Tyr Ser Gly His Asp Ser Arg Phe Glu Tyr Leu Tyr
                165                 170                 175

Lys Phe Glu Ser Ala Ala Ala Trp Asp Pro Ala Asp Ala Asn Pro Ala
                180                 185                 190

Asn Arg Leu Ala Thr Gly Asp Lys Tyr Met Asp Glu Gly Thr Leu Tyr
                195                 200                 205

Val Ala Arg Arg Thr Asp Glu Thr Asn Pro Ala Asn Pro Arg Leu Asn
                210                 215                 220

Asn Lys Phe Gly His Val Ile Arg Leu Thr Asn Glu Asn Gly Asp Gln
225                 230                 235                 240

Ala Val Ile Gly Ala Asp Asn Gln Ala Glu Leu Lys Arg Phe Phe Val
                245                 250                 255

Gly Pro Asn Gly Cys Glu Val Thr Gly Phe Thr Ile Ser Pro Asp Tyr
                260                 265                 270
```

-continued

```
Lys Ala Ala Thr Val Val Ile Arg Arg Glu Asp Gly Gly Glu Ile Ala
        275                 280                 285
Val
```

MEANS TO DETECT WHETHER ACUTE HEPATOPANCREATIC NECROSIS DISEASE-CAUSING VIBRIO PARAHAEMOLYTICUS IS VIRULENT OR NON-VIRULENT

CROSS-REFERENCE TO RELATED APPLICATIONS

This application is a national phase entry under 35 U.S.C. § 371 of International Patent Application PCT/EP2020/075292, filed Sep. 10, 2020, designating the United States of America and published as International Patent Publication WO 2021/048258 A1 on Mar. 18, 2021, which claims the benefit under Article 8 of the Patent Cooperation Treaty to European Patent Application Serial No. 19197064.9, filed Sep. 12, 2019.

TECHNICAL FIELD

This disclosure relates to the field of monitoring acute hepatopancreatic necrosis disease in shrimp. The detection of the presence of alkaline phosphatase Phox enzyme is disclosed, or, of the PiRA$^{VP}$ and/or the PirB$^{VP}$ toxins of acute hepatopancreatic necrosis disease-causing Vibrio parahaemolyticus correlates with non-virulence or virulence, respectively, of the bacterium. Hence, an assay capable of detecting the Phox enzyme and/or the toxins could be very useful to monitor the disease in shrimp.

BACKGROUND

The Gram-negative marine bacterium, Vibrio parahaemolyticus is an important aquatic pathogen and several strains are capable of causing acute hepatopancreatic necrosis disease (AHPND) and other important disease in shrimp aquaculture (Jayasree et al., 2006; Li et al., 2017). The shrimp production in AHPND-affected regions has at times dropped considerably (to ~60%) and disease has caused global loss of $1 billion per year to the shrimp farming industry (Lee et al., 2015; Nunan et al., 2014). Several V. parahaemolyticus strains indeed contain a pVA1 plasmid (63-70 kb) encoding the binary toxins named PirA$^{VP}$ and PirB$^{VP}$ homologous to the Photorhabdus luminescens insect-related (Pir) toxins PirA/PirB (Camp-Cordova et al., 2017; Gomez-gil et al., 2014; Han et al., 2015; Lee et al., 2015). The PirA$^{VP}$ and PirB$^{VP}$ toxins are the primary virulence factor of bacteria that mediates AHPND etiology and mortality in shrimps (Camp-Cordova et al., 2017; Dong et al., 2017; Kumar et al., 2018))

However, it is completely unknown whether the latter virulent phenotype can switch into a non-virulent phenotype and whether the phenotypes can be easily distinguished via easy-to-use assay measuring products that are secreted by each of the phenotypes. Such an assay would be very useful to monitor, for example, AHPND in shrimp.

BRIEF DESCRIPTION OF THE DRAWINGS

FIG. 3, Panel (B). Survival (%) of brine shrimp larvae after 60 hours of challenge with 1.3, 1.95, 2.6 and 3.9 µg of VP$_{AHPND}$ extracellular protein (ECP) concentrated from V. parahaemolyticus M0904 culture incubated with constant agitation of 120 min$^{-1}$ with PirA$^{VP}$ and PirB$^{VP}$ toxin or 110 min$^{-1}$ with alkaline phosphatase PhoX. Non-challenged larvae served as a negative control. Error bars represent the standard error of three replicates; different letters indicate significant differences (P<0.001).

FIG. 3, Panel (C). Survival (%) of brine shrimp larvae after 60 hours of challenge with 1.3, 1.95, 2.6 and 3.9 µg of VP$_{AHPND}$ purified PirA$^{VP}$ and PirB$^{VP}$ toxin or VP$_{AHPND}$ purified alkaline phosphatase PhoX. Non-challenged larvae served as a negative control. Error bars represent the standard error of three replicates; different letters indicate significant differences (P<0.001).

DETAILED DESCRIPTION

This disclosure shows that low shaking speed can trigger phenotype switching in V. parahaemolyticus, mediating, among others, changes in virulence toward shrimp. The disclosure indeed shows that V. parahaemolyticus at lower shaking speed downregulate PirAB$^{VP}$ toxin expression while producing and secreting an alkaline phosphatase PhoX enzyme. This disclosure thus shows that *V. parahaemolyticus* displays distinct phenotypes depending on environmental conditions: a virulent and a non-virulent phenotype.

Therefore, the disclosure relates in first instance to the usage of the alkaline phosphatase Phox of *Vibrio parahaemolyticus* as a marker to phenotype the *Vibrio parahaemolyticus* as non-virulent.

The term "*Vibrio parahaemolyticus*" refers to all strains of a Gram-negative marine bacterium, which is an important aquatic pathogen and capable of causing acute hepatopancreatic necrosis disease (AHPND) and several other important diseases such as tail necrosis, shell disease, red disease, loose shell syndrome (LSS), and white gut disease (WGD) in shrimp aquaculture (Jayasree et al., 2006; Li et al., 2017). The latter term more specifically relates the *V. parahaemolyticus* strains containing a pVA1 plasmid (63-70 kb) encoding the binary toxins named PirA$^{VP}$ and PirB$^{VP}$ homologous to the *Photorhabdus luminescens* insect-related (Pir) toxins PirA/PirB (Camp-Cordova et al., 2017; Han et al., 2015) (Gomez-Gil et al. 2014; Soto-Rodriguez et al. 2015; Lee et al. 2015). The PirA$^{VP}$ and PirB$^{VP}$ toxins are the primary virulence factor of bacteria that mediates AHPND etiology and mortality in shrimps (Campa-Córdova et al., 2017; Dong et al., 2017; Han et al., 2015). A non-limiting example of such a *V. parahaemolyticus* strain is strain M0904 deposited with the Belgian Coordinated Collections of Micro-Organisms (BCCM/LMG Bacteria Collection), Laboratorium voor Microbiologie, Universiteit Gent (UGent), K. L. Ledeganckstraat 35, B-9000 Gent, Belgium and having deposit number (accession number): LMG P-31518.

The term "non-virulent" *Vibrio parahaemolyticus* indicates that the bacterium is not mediating AHPND etiology and mortality in shrimps and has thus a reduced toxicity in shrimp when compared to bacteria mediating AHPND etiology and mortality in shrimps.

The term "alkaline phosphatase Phox" refers to an enzyme that releases a free inorganic phosphate from many phosphate-containing compounds and provides bacteria with the inorganic phosphate as a nutrient as is described by Torriani (1990). More specifically, the term refers to the enzyme having the accession number—Q87JR9 (UniProt) and having the following amino acid sequence:

```
                                              (SEQ ID NO: 1)
MSKETFDATRYNQSDNKPFEEVLEASLSRRSILKGGLGISAMTAFGAFGL

AGCNSSSSGTSASNGSGVSKAVLNFDSIPGSLTDAVSIPQGYTAQVLVPW

GTPLNAQGSAWKNDGSNTSSDQLNALGMHHDGMHFFPLNDSTTDGLLCIN

HEYIDTSALHPNGPTVANGVRTIVDEVRKEINAHGVSVVRIQLEDNMWKL

VDTDPLNRRYTGATVMDLSGPVAHTALTVTRFSPDGSQARGTLNNCGNGY

TPWGTYLTCEENWPGYFVNAGTRTEEQDRIGVDDKSTRYLWETLAGNSEE

RLDEFTRFNVAPTGTSSADDYRNEANGHGYIVEIDPYTQNSRAKKRTALG

RFRHEGCAFGKLEAGKPVVFYSGHDSRFEYLYKFESAAAWDPADANPANR

LATGDKYMDEGTLYVARFNEDSTGTWLPLTLDSVTTSGGTLADHFNSLAE

IIINTAGAADLVGATPMDRPEWCSVDPFTGSVYLTLTNNTRRTDETNPAN

PRLNNKFGHVIRWDEGTSATDFIWDIFVFGSPENGDADTNRSGLNELNQF

ASPDGLAFDGRGILWIQTDNGADEVTSYTNDQMLAVVPSKLTNENGDQAV

-continued
IGADNQAELKRFFVGPNGCEVTGFTISPDYKSLFVNIQHPGNWPYSDDAA

QETPTGTTVRPRAATVVIRREDGGEIAV
```

The term "a marker to phenotype" refers to the usage of the presence of the alkaline phosphatase PhoX in a substrate such as shrimp culture water to indicate that the *Vibrio parahaemolyticus* is non-virulent.

Furthermore, this disclosure shows the usage as described above to monitor acute hepatopancreatic necrosis disease in shrimp.

The term "shrimp" refers to any shrimp known in the art and more particularly relates to freshwater shrimp such as *Macrobrachium rosenbergii* and *Penaeus* species.

The term "acute hepatopancreatic necrosis disease (AHPND)" refers to a disease, originally known as early mortality syndrome (EMS), which is characterized by acute, massive sloughing of hepatopancreatic tubule epithelial cells and which is caused by a virulent strain of Gram-negative marine bacterium, *Vibrio parahaemolyticus* ubiquitous in estuarine and coastal waters (Li et al., 2017; Tran et al., 2013).

Moreover, this disclosure relates to the usage of means to detect the alkaline phosphatase Phox enzyme of *Vibrio parahaemolyticus* or, in other words, relates to the usage of molecules that bind to the alkaline phosphatase Phox enzyme of *Vibrio parahaemolyticus* (such as in an ELISA/antibody-based assay) to phenotype the *Vibrio parahaemolyticus* as non-virulent.

The term "molecules that bind to the alkaline phosphatase Phox enzyme of *Vibrio parahaemolyticus*" relates to any molecule known in the art (such as peptides, antibodies or fragments thereof and the like) that can be used to specifically detect the presence of a particular protein such as the alkaline phosphatase Phox enzyme of *Vibrio parahaemolyticus* in a matrix such as water.

More specifically, the disclosure relates to the usage of means as describe above wherein the molecules are antibodies or fragments thereof specifically binding to the alkaline phosphatase Phox enzyme of *Vibrio parahaemolyticus*.

The term "antibody or a fragment thereof" relates to an antibody characterized as being able to specifically bind to the alkaline phosphatase Phox enzyme of *Vibrio parahaemolyticus* or any part thereof, or, an antigen-binding fragment thereof, particularly of the F(ab')2, F(ab) or single chain Fv (scFv) type, or any other type of recombinant antibody known in the art.

The phrase "specifically (or selectively) detects (or binds)" the alkaline phosphatase Phox enzyme of *Vibrio parahaemolyticus*," when referring to an antibody, refers to a binding reaction that is determinative of the presence of the protein in a heterogeneous population of proteins and other biologics. Thus, under designated immunoassay conditions, the specified antibodies bind to a particular protein at least two times the background and do not substantially bind in a significant amount to other proteins present in the sample. Specific binding to an antibody under such conditions may require an antibody that is selected for its specificity for a particular protein. For example, polyclonal antibodies raised to marker "X" from a specific species can be selected to obtain only those polyclonal antibodies that are specifically immunoreactive with marker "X" and not with other proteins, except for polymorphic variants and alleles of marker "X." This selection may be achieved by subtracting out antibodies that cross-react with marker "X" molecules from other species. A variety of immunoassay formats may be used to select antibodies specifically immunoreactive with a particular protein. For example, solid-phase ELISA immunoassays are routinely used to select antibodies specifically immunoreactive with a protein (see, e.g., Harlow & Lane, Antibodies, A Laboratory Manual (1988), for a description of immunoassay formats and conditions that can be used to determine specific immunoreactivity). Typically, a specific or selective reaction will be at least twice background signal or noise and more typically more than 10 to 100 times background.

Furthermore, the disclosure relates to an assay (for example, a lateral flow immunochromatographic assay as described by Delmulle et al. (2005) comprising molecules that bind to the alkaline phosphatase Phox enzyme of *Vibrio parahaemolyticus* and comprising molecules that bind to the $PirA^{VP}$ and/or the $PirB^{VP}$ toxins of *Vibrio parahaemolyticus*.

The term "$PirA^{VP}$ and/or $PirB^{VP}$ toxins of *Vibrio parahaemolyticus*" relates to extracellular secreted toxins produced by AHPND-causing *V. parahaemolyticus*, which are homologous to the insecticidal PirA and PirB toxins (δ-endotoxins) of *Photorhabdus* and Xenorhabdus species (Han et al., 2015). $PirA^{VP}$ facilitates target-specific recognition by binding to a certain ligand on the cell membrane/receptors (e.g., monosaccharides like N-acetylgalactosamine (GalNAC) and oligosaccharides, while $PirB^{VP}$ (containing an N-terminal domain, $PirB^{VP}N$, and a C-terminal domain, $PirB^{VP}$ C), is mainly responsible for cell death via pore formation and is involved in protein-protein and protein-ligand interactions (Kumar et al., 2019; Lin et al., 2017; Sirikharin et al., 2015).

The terms "molecules that bind to the $PirA^{VP}$ and/or the $PirB^{VP}$ toxins of *Vibrio parahaemolyticus*" have similar meaning as described above for "molecules that bind to the alkaline phosphatase Phox enzyme of *Vibrio parahaemolyticus.*"

The disclosure further relates to an assay as described above to phenotype the *Vibrio parahaemolyticus* as non-virulent or as virulent.

This disclosure more specifically relates to an assay as described above wherein the molecules are antibodies or fragments thereof binding to the alkaline phosphatase Phox enzyme of *Vibrio parahaemolyticus*, and/or binding to the $PirA^{VP}$ and/or the $PirB^{VP}$ toxins of *Vibrio parahaemolyticus*.

The terms "antibodies or fragments thereof specifically binding to the $PirA^{VP}$ and/or the $PirB^{VP}$ toxins of *Vibrio parahaemolyticus*" have a similar meaning as described above for antibodies or fragments thereof binding to the alkaline phosphatase Phox enzyme of *Vibrio parahaemolyticus*.

The disclosure also relates to an assay as described above wherein the assay is an antibody-based assay such as a lateral flow immunochromatographic assay or an enzyme-linked immunosorbent assay (ELISA). A similar immunoassay-based lateral flow dipstick was—for example—developed for rapid detection of aflatoxin B1 in pig feed (Delmulle et al., 2005).

Moreover, the disclosure relates to a process to phenotype the *Vibrio parahaemolyticus* as non-virulent comprising:

providing a sample such as a shrimp culture water sample
bringing the water sample into contact with molecules that bind to the alkaline phosphatase Phox enzyme of *Vibrio parahaemolyticus*, and
determining whether the alkaline phosphatase Phox enzyme of *Vibrio parahaemolyticus* is present in the sample, wherein the *Vibrio parahaemolyticus* is a non-virulent phenotype when the enzyme is present in the sample.

This disclosure also relates to a process as described above wherein the sample is also brought into contact with molecules that bind to the $PirA^{VP}$ and/or the $PirB^{VP}$ toxins of *Vibrio parahaemolyticus* and wherein it is also determined whether $PirA^{VP}$ and/or the $PirB^{VP}$ toxins of *Vibrio parahaemolyticus* are present in the sample, wherein the *Vibrio parahaemolyticus* is a non-virulent phenotype when the enzyme is present in the sample and wherein the *Vibrio parahaemolyticus* is a virulent phenotype when at least one of the toxins is present in the sample.

EXAMPLES

Materials and Methods

Bacterial Strains and Growth Conditions

Total two bacterial strains were used in the study: *Vibrio parahaemolyticus* M0904 (AHPND strains) and *Aeromonas hydrophila* LVS3 (Defoirdt et al., 2006; Kumar et al., 2018). LVS3 (autoclaved) were used as feed for *Artemia* larvae and M0904 were used for toxin and enzyme production for the challenge assay. The M0904 strain used in the experiment M0904 is deposited by the department of Animal Production/Lab for Aquaculture & *Artemia* Reference Center (Campus Coupure F, CoupureLinks 653, 9000 Gent, Belgium) with the Belgian Coordinated Collections of Micro-Organisms (BCCM/LMG Bacteria Collection), Laboratorium voor Microbiologie, Universiteit Gent (UGent), K. L. Ledeganckstraat 35, B-9000 Gent, Belgium and having deposit number (accession number): LMG P-31518. A stock culture of M0904 were streaked onto Marine agar plates (Carl Roth, Belgium) (MA) to obtain pure colonies. A single colony was inoculated into Marine broth (MB) (Carl Roth, Belgium), incubated overnight at 28° C. under constant agitation (120 min') and the stocked culture was prepared in 40% glycerol and stored in −80° C. The LVS3 culture (LMG 22148) was collected from the Laboratory of Aquaculture and *Artemia* Reference Center, Ghent University, Belgium. The strain was streaked onto Marine agar plates (Carl Roth, Belgium), afterwards single colony was inoculated in Marine broth (Carl Roth, Belgium), and stock culture was prepared in a similar manner.

Analysis of *V. parahaemolyticus* Cells Cultured in Different Conditions (a) Light and Fluorescence Microscopy The *V. parahaemolyticus* M0904 strain culture under constant agitation at either 110 $min^{-1}$ or 120 $min^{-1}$ were observed by light and fluorescence microscope to observe the changes at cellular level. At first, 20 μl of bacterial suspension cultured at either 110 $min^{-1}$ or 120 $min^{-1}$ were put onto a clean glass slide. Than a cover glass was placed over the sample and excess liquid were removed by gently pressing the cover glass. The samples were observed in light microscope (Zeiss Axioskop 2 plus, Carl Zeiss, Germany) in 10×, 40×, 36× and 100× magnification to detect the floccules formation by the bacterial strain. Later, the bacterial samples were stained with Calcofluor white stain (Sigma-Aldrich, USA) to detect the extracellular polysaccharides in the floccules produced by *V. parahaemolyticus* M0904 strain through fluorescence microscope (Zeiss Axioskop 2 plus, Carl Zeiss, Germany). Briefly, 20 μl of bacterial suspension were put onto a clean glass slide. Afterwards, 1 drop of Calcofluor white stain and 1 drop of 10% potassium hydroxide were added to the samples (according to the manufacturer instructions). The samples were covered with cover glass and incubated for 1 minute at room temperature. Subsequently, the slides were examined under fluorescence microscope with excitation of band pass (BP) 365/12, beam splitter FT 395 and emission long pass 397 in 10×, 40×, 36× and 100× magnification.

(b) Flow Cytometry

The *V. parahaemolyticus* M0904 strain cells cultured at either 110 min$^{-1}$ or 120 min$^{-1}$ constant agitation was diluted to 5×10$^9$ cells/ml with sterile MB using spectrophotometer (Genesys 20, Thermo Spectronic). Afterwards, 1 ml of bacterial suspension was transferred to 2 ml sterile EPPENDORF® tubes and centrifuged for 10 minutes at 8000×g in room temperature. The bacterial cells were collected and resuspended in 10 ml Tris-buffered saline (0.13 M NaCl and 10 mM Tris hydrochloride, pH 7.4). Later, 250 µl of bacterial cells in Tris-buffered saline was transferred to 2 ml sterile EPPENDORF® tubes and 1 µl of FITC (fluorescein isothiocyanate)-lectin was added (7 different types lectins were used with different glycan specificity, Table 51). The bacterial cell and lectin mixture were then transferred to 96 well plate and to facilitate the binding of FITC-lectins to the bacteria cells the plates were incubated for 30 minutes in dark at room temperature.

Subsequently, the samples were analyzed with a CytoFLEX flow cytometer system (Beckman Coulter's Life sciences, France) equipped with a 37-, m (pore size) filter, a 75-µm (pore size) orifice, and a 0.3 neutral density filter and photomultiplier tube set at 500 V. The calibration and standardization of the flow cytometer were done in accordance with manufacturer specifications. The fluorescent microbeads were used as standards for fluorescence and volume and green fluorescence were measured at 525 nm (FITC) and 488 nm (FSC). The flow cytometer was set as follows: gain FSC (forward scatter)—106, gain FITC—113 and speed—4 (implying an event rate never exceeding 1000 events per second). Counts were recorded as logarithmic signals and were triggered on the green fluorescence channel. Data were processed with CytExpert software (Beckman Coulter's Life sciences, France), using electronic gaining to separate the desired events. Presentation of the data as FITC/count or FSC/count histogram plot allowed for optimal distinction between FITC-lectins labelled bacteria cells and instrument noise or sample background (Frossard et al., 2016; Hammes and Egli, 2010).

(c) Marine Agar with Congo Red (MACR) Plate Method

The marine agar with Congo red (MACR) plate method were used out to determine the production of extracellular slime by *V. parahaemolyticus* M0904 strain following the procedure as described by Freeman et al. (Freeman et al., 1989) and Phuoc et al. (Phuoc et al., 2009) with slight modifications. Briefly, the *V. parahaemolyticus* M0904 culture were incubated for 24 hours at 28° C. in 20 ml marine broth (MB) with constant agitation at either 110 min$^{-1}$ or 120 min$^{-1}$. Subsequently, the broth was discarded, and cells attached to the bottom of the Erlenmeyer were collected after adding and mixing with 5 ml of FASW. The bacterial suspension in FASW were streaked onto marine agar with Congo red (MACR) plates (37.4 g MB, 50 g sucrose, 15 g agar and 0.8 g Congo red). The Congo red was prepared as a stock solution, autoclaved and then added to the culture medium when it had cooled to 55° C. After inoculation, the plates were incubated for 24 hours at 28° C. The bacterial strains that produce extracellular slime develop different color colonies in MACR plates (Freeman et al., 1989). The assay was performed in triplicates and are representative of at least two independent experiment.

Purification of *V. parahaemolyticus* Extracellular Protein (VP$_{AHPND}$ ECP)

In total, two separate tests were performed. Briefly, the *V. parahaemolyticus* M0904 strain was grown overnight at 28° C. in 20 ml Marine broth (MB) (Carl Roth, Belgium) in 50 ml Erlenmeyer with constant agitation either 110 min$^{-1}$ or 120 min$^{-1}$. The overnight grown bacterial suspension was centrifuged for 15 minutes at 3500×g. The supernatant was collected and filtered with a 0.2-µm sieve to obtain cell free supernatant (CFS) of *V. parahaemolyticus*. The CFS of *V. parahaemolyticus* was then concentrated and dialyzed with phosphate buffered saline (PBS) with 10 kDa Amicon® ultra-15 centrifugal filters (Merck Millipore, USA) (Kumar et al., 2019). The concentrated extracellular protein (VP$_{AHPND}$ ECP) was collected and immediately preserved at −80° C. for further analysis. NonoLC-MS/MS analysis of PirA$^{VP}$ and PirB$^{VP}$ toxins and alkaline phosphatase PhoX enzyme from VP$_{AHPND}$ ECP To identify the presumptive proteins produced by *V. parahaemolyticus* AHPND strain from different culture conditions, the concentrated VP$_{AHPND}$ ECP samples were combined with loading buffer, vortexed, heated for 5 minutes at 95° C. and electrophoresed in 4-20% SDS-PAGE gel (Bio-Rad, Belgium), with each lane receiving equivalent volume (10 µl) of protein. The gels were stained with Coomassie Biosafe (BioRad Laboratories) and the signals were detected by a ChemiDoc MP imaging system (BioRad, Belgium). The protein concentration was determined by the Bradford method (Bradford, 1976) using bovine serum albumin as standard. The possible candidate bands of PirA$^{VP}$ and PirB$^{VP}$ toxin and alkaline phosphatase PhoX enzyme on Coomassie stained SDS-PAGE gels was excised using a clean scalpel (preferentially under the laminar flow to avoid the keratin contamination) and the gel-pieces (with a clean pincet) were transferred into sterile EPPENDORF® tubes. The gel-pieces were rinsed twice with 500 µl sterile distilled water and kept in −20° C. for LC-MS/MS analysis.

The gel pieces were then washed consecutively with water, acetonitrile (ACN) in water (50/50, v/v) and ACN and were then dried completely by vacuum drying. The dried gel bands were rehydrated with 15 µl of a trypsin-containing solution (5 ng/µl in 50 mM ammonium bicarbonate) and 50 mM ammonium bicarbonate was added until the bands were completely submerged. Next, the bands were incubated overnight at 37° C. for digestion and elution of the resulting peptides from the gel. Formic acid was added to the eluted peptides to deactivate trypsin and the samples were vacuum dried. Following in-gel-digestion, the dried peptide samples were dissolved in 20 µl loading buffer (0.1% TFA in water/acetonitrile, 2/98 (v/v)) and half of each sample was analyzed on a tandem configured Ultimate 3000 RSLC nanoLC (Thermo Scientific, Bremen, Germany) in-line connected to an LTQ ORBITRAP® Elite (Thermo Fisher Scientific, Bremen, Germany) equipped with a pneu-Nimbus dual ion source (Phoenix S&T) and a Butterfly nano-LC column oven (Phoenix S&T) to keep the column temperature constant at 50° C. The sample mixture was first loaded on a trapping column (made in-house, 100 µm I.D.×20 mm length, 5 µm beads C18 Reprosil-HD, Dr. Maisch). After flushing from the trapping column, the sample was loaded on a reverse-phase column (made in-house, 75 µm I.D.×200 mm length, 1.9 µm beads C18 Reprosil-HD, Dr. Maisch). Peptides were loaded with loading buffer and were separated with a non-linear 1.5-hour gradient from 98% solvent A (0.1% formic acid in water) to 56% solvent B (0.1% formic acid in water/ACN 20:80 (v/v)) at a flow rate of 250 nl/min followed by a 5-minute wash reaching 99% buffer B.

The mass spectrometer was operated in data dependent, positive ionization mode, automatically switching between MS and MS/MS acquisition for the 20 most abundant peaks in a given MS spectrum. The source voltage was 3 kV, and the capillary temperature was 275° C. In the LTQ ORBITRAP® Elite, full scan MS spectra were acquired in the ORBITRAP® (m/z 300-2,000, AGC target $3\times10^6$ ions, maximum ion injection time 100 ms) with a resolution of 60 000 (at 400 m/z). The 20 most intense ions fulfilling predefined selection criteria (AGC target $5\times10^3$ ions, maximum ion injection time 20 ms, spectrum data type: centroid, exclusion of unassigned and 1 positively charged precursors, dynamic exclusion time 20 s) were then isolated in the linear ion trap and fragmented in the high-pressure cell of the ion trap. The CID collision energy was set to 35 V and the polydimethylcyclosiloxane background ion at 445.120028 Da was used for internal calibration (lock mass).

Data analysis was performed with MaxQuant (version 1.6.2.6) using the *Andromeda* search engine with default search settings including a false discovery rate set at 1% on both the peptide and protein level. Spectra were searched against the proteins of *Vibrio parahaemolyticus* strain 20130626002S01 in the database (containing 5004 protein sequences) supplemented with sequences of the PirA$^{VP}$ and PirB$^{VP}$ toxins (GENBANK®, NCBI). The mass tolerance for precursor and fragment ions was set to 4.5 and 20×g, respectively, during the main search. Enzyme specificity was set as C-terminal to arginine and lysine, also allowing cleavage at proline bonds with a maximum of two missed cleavages. Variable modifications were set to oxidation of methionine residues, propionamidation on cysteines and acetylation of protein N-termini. Only proteins with at least one unique or razor peptide were selected. A minimum ratio count of two unique or razor peptides was required for quantification. The resulting protein lists were sorted on descending iBAQ ratio, revealing PirA$^{VP}$, PirB$^{VP}$ and PhoX as most abundant protein in their respective protein band. The identified peptides of PirA$^{VP}$ and PirB$^{VP}$ toxins were mapped on the corresponding protein sequence.

PCR Confirmation for Presence of AHPND Plasmid in *V. parahaemolyticus* Cultures The *V. parahaemolyticus* M0904 strain cultured at either 110 min$^{-1}$ or 120 min$^{-1}$ was confirmed to harbor the AHPND plasmid by PCR using AP3 primers (Table S2). The AP3 based PCR fragment was not present in non-AHPND *V. parahaemolyticus* (Sirikharin et al., 2014; Suong et al., 2017).

RNA Extraction and Reverse Transcription

The *V. parahaemolyticus* M0904 strain were grown overnight in triplicate in 20 ml sterile marine broth (MB) at either 110 min$^{-1}$ or 120 min'. Cells were harvested after 12 and 24 hours of incubation and total RNA was extracted with QIAGEN® RNEASY® Plus Mini Kit (Cat No. 74136) from the bacterial samples in tri-plicate according to the manufacturer instructions. The RNA quality and quantity were measured on NANODROP® spectrophotometer (ThermoFisher Scientific, Belgium) and RNA samples with A260/A280 ratios >2.0 and A260/A230 ratios >1.5 were used for the analysis. The RNA integrity was checked by agarose gel electrophoresis and the RNA samples were stored in −80° C. for subsequent use.

Reverse transcription was done with the RevertAid™ H Minus First Strand cDNA Synthesis Kit (Thermo Fisher Scientific, Belgium) according to the manufacturer's guidelines. Briefly, 1 µg total RNA and 1 µl random hexamer primer solution was mixed first. Then, 8 µl of reaction mixture containing 4 µl of 5× reaction buffer (0.25 mol$^{-1}$ Tris-HCl pH 8.3, 0.25 mol$^{-1}$ MgCl$_2$, 0.05 mol$^{-1}$ DTT), 2 µl of 0.01 mol$^{-1}$ dNTP mix, 20 units of ribonuclease inhibitor, 200 units of RevertAid™ H minus M-MuLV reverse transcriptase was added. The reaction mixture was incubated for 5 minutes at 25° C. followed by 60 minutes at 42° C. The reaction was terminated by heating at 70° C. for 5 minutes and then cooled to 4° C. Complementary deoxyribonucleic acid (cDNA) samples were checked by PCR and stored at −20° C. for further use.

Quantitative Real-Time PCR (RT-qPCR) Analysis

The expression of 2 VP$_{AHPND}$ plasmid related virulent genes including toxin and coding genes of virulent plasmid and 1 alkaline phosphatase PhoX gene associated with floccules formation were measured by RT-qPCR with pair of specific primers using StepOnePlus® Real-time PCR systems (Applied Biosystems) (Table S3). The Ct values from the two reference genes rpoA (RNA polymerase A submit) and toxR mRNA, used as the internal control, were subjected to geomean and expression of the genes was calculated relative to the rpoA and toxR mRNA levels. The amplification was performed in a total volume of 20 containing 10 µl of 2× Maxima SYBR Green/ROX qPCR Master Mix (Thermo Fisher Scientific), 1 µl of cDNA (50 ng), 8 µl of nuclease free water and 0.5 µl of each specific primer. Master mixes were prepared for each biological replicate of the sample in triplicate and RT-qPCR for target and reference genes was performed with a four-step amplification protocol: initial denaturation (10 minutes at 95° C.); 40 cycles of amplification and quantification (15 seconds at 95° C., 30 seconds at 60° C., and 30 seconds at 72° C.); melting curve (55-95° C.) with a heating rate of 0.10° C./s and a continuous fluorescence measurement) and cooling (4° C.). Negative control reaction was included for each primer set by omitting template cDNA. The comparative CT method (2-ΔΔCt method) following Livak and Schmittgen (Livak and Schmittgen, 2001) was used to analyze the expression level of the target genes and verified by Pfaffl relative standard curve method (Pfaffl, 2002). The Log transformed 2^ΔΔCT value were subjected of a t-test, and the p values smaller than 0.05 were considered statistically significant.

Axenic Brine Shrimp Hatching

The gnotobiotic brine shrimp larvae was produced by hatching high-quality cysts axenically (germ-free) following decapsulation and hatching procedures as described by Baruah et al. (Baruah et al., 2014). Briefly, 200 mg of *A. franciscana* cysts (EG® type, batch 21452, INVE Aquaculture, Dendermonde, Belgium) were hydrated in 18 ml of distilled water for 1 hour. Sterile cysts and larvae were obtained via decapsulation using 660 µl NaOH (32%) and 10 ml NaOCl (50%). During the reaction, 0.2-µm filtered aeration was provided. All manipulation was carried out under a laminar flow hood and all tools were sterilized. The decapsulation was stopped after 2 minutes by adding 10 ml Na$_2$S$_2$O$_3$ at 10 g/l. The decapsulated cysts were washed with filtered autoclaved seawater (FASW) containing 35 g/l of INSTANT OCEAN® synthetic sea salt (Aquarium Systems, Sarrebourg, France). The cysts were resuspended in 50 ml tube containing 30 ml FASW and hatched for 24 hours on a rotor (6 min') at 28° C. with constant illumination of approximately 27 µE/m$^2$ s. After 28 hours of incubation, hatched larvae at developmental stage instar II (mouth is opened to ingest particles) were collected, and the axenicity was verified by spread plating (100 ml) as well as by adding (500 µl) of the hatching water on Marine Agar and Marine Broth, respectively, followed by incubating at 28° C. for 5 days (Baruah et al., 2012). Experiments started with non-axenic larvae were discarded.

Brine Shrimp Challenge Assay

In total, 3 separate experiments were performed to determine the toxicity *V. parahaemolyticus* M0904 strain (in different culture conditions), $VP_{AHPND}$ ECP and purified alkaline phosphatase PhoX enzyme and $PirA^{VP}$ and $PirB^{VP}$ toxin in brine shrimp larvae. The toxicity assay were performed according to the method developed by Kumar et al. (Kumar et al., 2018). In the first experiment, the hatched brine shrimp larvae (at developmental stage II) were collected and group of 20 larvae were transferred to sterile 40-ml glass tubes containing 10 ml FASW. Subsequently, the brine shrimp larvae were challenged with pathogenic *V. parahaemolyticus* M0904 strain cultured in 20 ml sterile marine broth (MB) at either 110 $min^{-1}$ or 120 $min^{-1}$ constant agitation at $10^7$ cells/ml and fed with autoclaved LVS3. Thereafter, the glass tubes were put back on the rotor and kept at 28° C. The survival of *Artemia* larvae was scored manually 48 hours after the addition of pathogen. The non-challenged larvae were maintained as negative control.

In the second experiment, group of 10 brine shrimp larvae were collected and transferred to 2 ml sterile EPPENDORF® tubes, containing 1 ml FASW. The brine shrimp larvae subsequently challenged with 1.3, 1.95, 2.6 and 3.9 μg/100 μl of $VP_{AHPND}$ extracellular protein (ECP) concentrated from *V. parahaemolyticus* M0904 culture incubated with constant agitation of 120 $min^{-1}$ with $PirA^{VP}$ and $PirB^{VP}$ toxin or 110 $min^{-1}$ with alkaline phosphatase PhoX enzyme. The survival of larvae was scored 60 hours after the addition of toxins. The non-challenged larvae were maintained as negative control.

In the third experiment, group of 10 brine shrimp larvae were counted and distributed into sterile 2 ml EPPENDORF® tubes and then challenged with 1.3, 1.95, 2.6 and 3.9 μg/100 μl of $VP_{AHPND}$ purified $PirA^{VP}$ and $PirB^{VP}$ toxin or $VP_{AHPND}$ purified alkaline phosphatase PhoX enzyme as described above in the lethality test. The non-challenged larvae were maintained as negative controls. The assays were performed in quintuplicate and are representative of at least two independent experiment.

Macrobrachium rosenbergii Rearing System

The experiments were carried out at the Laboratory of Aquaculture & *Artemia* Reference Center, Ghent University, Belgium, in a controlled temperature room. Acclimatized adult freshwater shrimp (*Macrobrachium rosenbergii*) obtained from laboratory and maintained in four separate freshwater recirculation units were used as brooders. For each experiment, larvae from single ovigerous female breeder were used. Matured female with fully ripe fertilized eggs (indicated by dark grey eggs) were transferred to the hatching tanks (30 l) containing brackish water (6 g/l salinity). Twenty-four hours after hatching, the larvae were collected and stocked in two separate brackish water (12 g/l salinity) recirculation units and fed with newly hatched axenic brine shrimp larvae. The brood stock management techniques were followed as previously described (Baruah et al., 2009; Nhan et al., 2010).

Macrobrachium Challenge Assay

The experiments were performed to determine the toxicity *V. parahaemolyticus* M0904 strain incubated in different culture condition in *Macrobrachium* larvae (8-days old). Group of 10 *Macrobrachium* larvae (8-days old) were collected and transferred to 150-ml glass tubes containing 100 ml sterile brackish water (12 g/l salinity) (Rahman et al., 2004). Subsequently, the larvae were challenged with pathogenic *V. parahaemolyticus* M0904 strain cultured in 20 ml sterile marine broth (MB) at either 110 $min^{-1}$ or 120 $min^{-1}$ at $10^6$ cells/ml (Kumar et al., 2018). The survival of larvae was scored at 12, 24, 36 and 48 hours after the addition of pathogen. *Macrobrachium* larvae that were not challenged with *V. parahaemolyticus* served as negative control. The assay was performed in quintuplicate and are representative of at least two independent experiment.

Statistical Analysis

Survival data of brine shrimp larvae were arcsin transformed to satisfy normality and homoscedasticity requirements as necessary. The data were then subjected to one-way analysis of variances (ANOVA) followed by Duncan's multiple range test using statistical software statistical package for the social sciences version 24.0. P values ≤0.001 were considered significant. Gene expressions results were presented as fold expression relative to the geometrical mean of two internal control genes (toxR and rpoA). The expression level in the floccules forming group (Control) was regarded as 1.0 and thereby the expression ratio of the non-floccule group (treatment) was expressed in relation to the control. Statistical analysis for the significant differences in the expression levels between the control and treatment was performed with single-tailed Student's t-tests using the log transformed data. Survival data of M *rosenbergii* were subjected to logistic regression analysis using GenStat 16 (VSN international, Hemel Hempstead, UK) to determine significant differences between the control and treatment.

Results

*V. parahaemolyticus* (Strain M0904) Grown at Low Shaking Speed Conditions (as an Example of an Environmental Condition) Flocculates In the first experiment, the effect of shaking speed on *Vibrio parahaemolyticus* M0904 strain was examined considering that altered environmental conditions might modulate the bacterium and trigger a set of adaptive regulatory mechanism (Balaban et al., 2004; Rossignol et al., 2009; Woude, 2006).

The present results show that *V. parahaemolyticus* cells incubated at constant agitation of 110 $min^{-1}$ (later on called M0904/110) flocculated, whereas cells grown at 120 $min^{-1}$ (later on called M0904/120) did not produces floccules. This indicate that shaking speed at M0904/110 induce flocculation in *V. parahaemolyticus* culture.

Figure 1A:
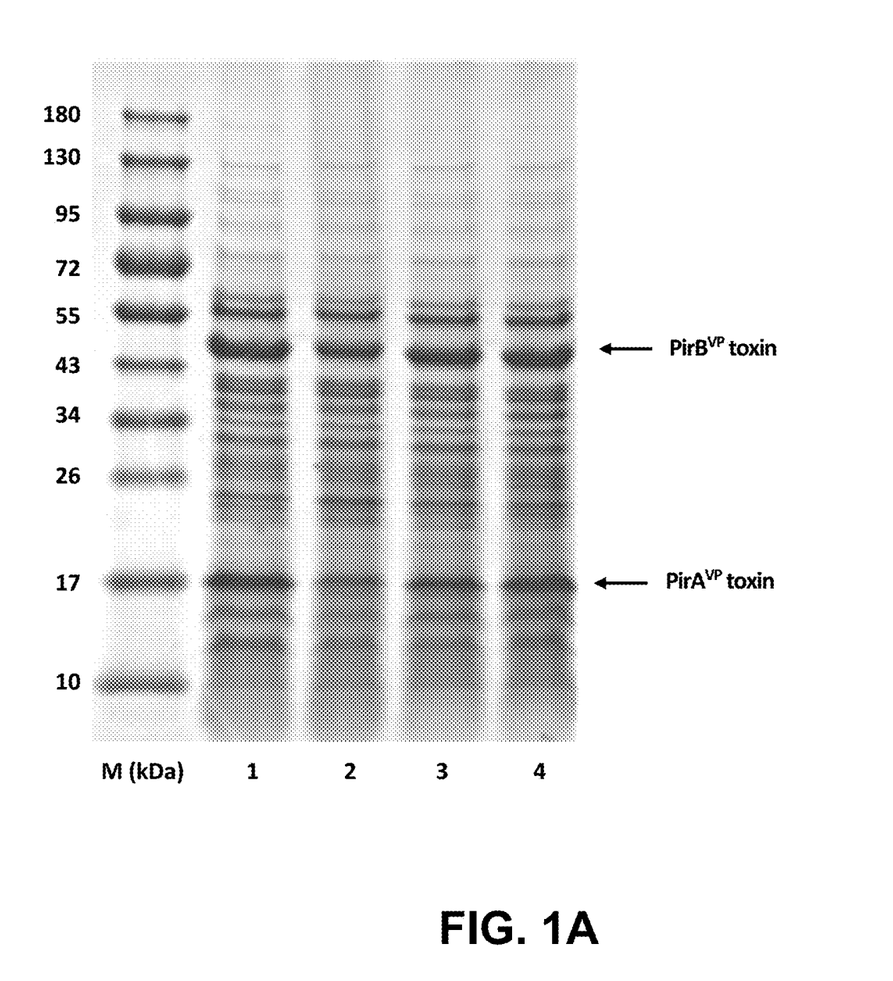
FIG. 1. Coomassie-stained SDS-PAGE gel of V. parahaemolyticus extracellular proteins (VP$_{AHPND}$ ECPs) from different culture conditions, Panel (i) VP$_{AHPND}$ ECP purified from V. parahaemolyticus M0904 culture with constant agitation (120 min$^{-1}$) and no floccule formation show two prominent bands at 13 and 50 kDa (Lane 1-4, showing the results of 4 replicate cultures). Panel (ii) VP$_{AHPND}$ ECP purified from V. parahaemolyticus M0904 culture with constant agitation (110 min$^{-1}$) and high flocculation exhibit a single prominent band at 73 kDa (Lane 1-4, showing the results of 4 replicate cultures).
Figure 1B:
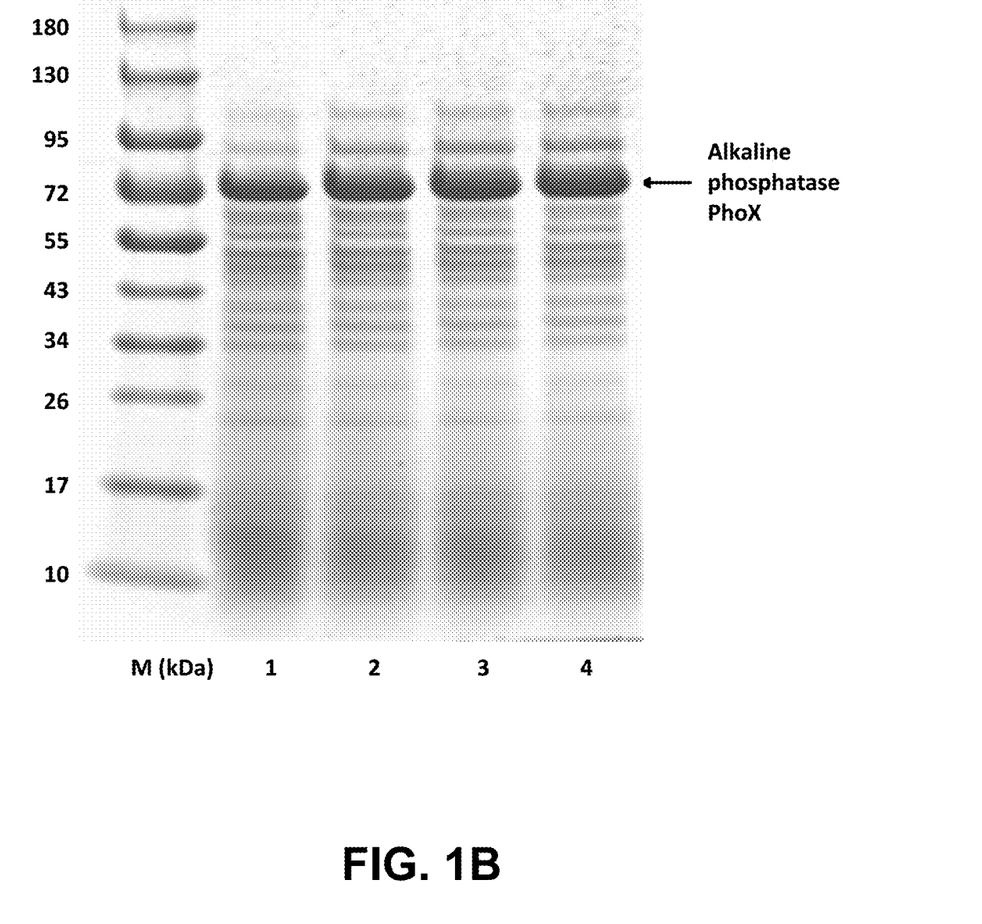

Flocculating Cells No Longer Produce $PirA^{VP}$ and $PirB^{VP}$ Toxin, but Rather Produce and Secrete an Alkaline Phosphatase PhoX As M0904/110 and M0904/120 cells display distinct phenotypic features at the level of EPS production, it was verified if secretion of proteins would be affected as well (Jayaraman, 2011; Sousa et al., 2011; Thomen et al., 2017). To investigate potential changes in the secretome, the protein present in the culture medium from M0904/110 and M0904/120 cells ($VP_{AHPND}$ ECP) were separated by SDS-PAGE and stained by coomassie. Strikingly, this analysis showed that M0904/120 cells secrete two main protein of 13 and 50 kDa, while M0904/110 cells secrete one prominent protein of 73 kDa, along with some other proteins that are differentially secreted by both cell types (FIG. 1A). Thus *V. parahaemolyticus* strain M0904 indeed changes the production of secreted proteins upon slight variation of shaking speed conditions.

Next to identify the main secreted proteins, corresponding protein bands at 13, 50 and 73 kDa where excised from the gel and subjected to mass spectrometry analysis. This analysis identified the two main proteins produced by M0904/120 cells as $PirA^{VP}$ (13 kDa) and $PirB^{VP}$ (50 kDa), the bacterial toxins encoded by a pVPA1 plasmid of AHPND *V. parahaemolyticus* strain (Han et al., 2015).

Table 1: The identified peptides from PirA$^{VP}$, PirB$^{VP}$ and alkaline phosphatase PhoX proteins. The corresponding protein bands at 13, 50 and 73 kDa where excised from the gel and subjected to mass spectrometry analysis. This analysis identified the two main proteins produced by M0904/120 cells as PirA$^{VP}$ (13 kDa) and PirB$^{VP}$ (50 kDa). The main protein secreted by M0904/110 cells was identified as PhoX, an alkaline phosphatase with a molecular weight of 73 kDa.

| Protein | Peptide sequence | Sequence coverage | Molecular weight (kDa) |
|---|---|---|---|
| PirA$^{VP}$ | MSNNIKHETDYSHDWTVEPNGGVTEVDSKHT PIIPEVGRSVDIENTGRGELTIQYQWGAPFMA GGWKVAKSHVVQRDETYHLQRPDNAFYHQR IVVINNGASRGFCTIYYH (SEQ ID NO: 2) | 100% | 13 |
| PirB$^{VP}$ | KSYLFDNYEVDPNYAFKIQDLVDESIIDAINGI LDSKDKIQDINETIENFGYAAAKDDYIGLVTH YLIGLEENFKRLTYENGEVVELGKYVDVIAN GPEAIDRIVFHFSDDRTFVVGENSGKPSVRVA AFSVAYELFHPDEFGTEK (SEQ ID NO: 3) | 36.073% | 50 |
| Alkaline phosphatase PhoX | TIVDEVRKEINAHGVSVVRIQLEDNMWKLVD TDPLNRRYTGATVMDLSGPVAHTALTVTRFS PDGSQARTEEQDRIGVDDKSTRYLWETLAGN SEERLDEFTRFNVAPTGTSSADDYRNEANGH GYIVEIDPYTQNSRKRTALGRFRHEGCAFGKL EAGKPVVFYSGHDSRFEYLYKFESAAAWDPA DANPANRLATGDKYMDEGTLYVARRTDETN PANPRLNNKFGHVIRLTNENGDQAVIGADNQ AELKRFFVGPNGCEVTGFTISPDYKAATVVIR REDGGEIAV (SEQ ID NO:4) | 42.625% | 73 |

The main protein secreted by M0904/110 cells was identified as PhoX, an alkaline phosphatase with a molecular weight of 73 kDa. These results suggest that M0904/110 cells stop producing PirA/B toxins, and instead produce another secreted protein with tentative alkaline phosphatase activity.

Floccules Formation Attenuates the Expression of Toxin Genes in *Vibrio parahaemolyticus*

Figure 2:
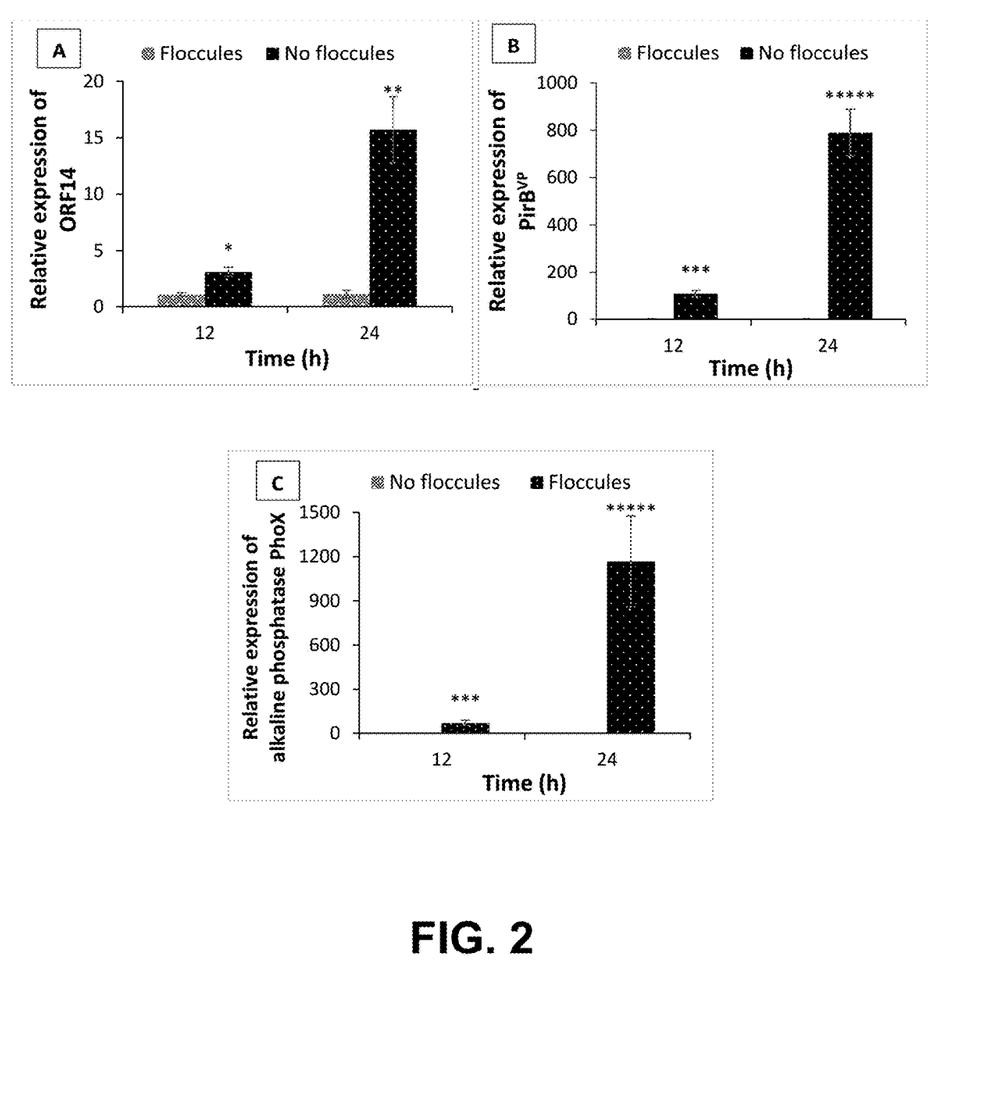
FIG. 2. Expression of virulent AHPND plasmid genes: Panel A—ORF14, Panel B—PirB$^{VP}$ and genes responsible for floccule formation: Panel C—alkaline phosphatase PhoX from Vibrio parahaemolyticus M0904 strain cultured under different culture conditions. The V. parahaemolyticus M0904 strain incubated overnight in 20 ml marine broth with constant agitation in either 110 min$^{-1}$ (high flocculation) or 120 min$^{-1}$ (no floccule formation). Samples from both culture conditions were collected for gene expression assay after 12 and 24 hours. For the virulent AHPND plasmid genes, the expression in the floccules formed group was set at 1. However, for alkaline phosphatase PhoX gene, the expression in the non-floccules formed group was set at 1. The results are the mean±SE (n=3) and are presented relative to V. parahaemolyticus toxR and rpoA mRNA. Asterisks represents significant difference between the V. parahaemolyticusM0904 culture with floccules (110 rpm) and no floccules (120 rpm) *(P<0.05), (P<0.01), *(P<0.001), **(P<0.0001), ***(P<0.00001).

To provide further evidence that M0904/110 decreased expression of virulence gene (as shown above), the transcription of pVA1 plasmid-bound genes, i.e., PirB$^{VP}$ (responsible for PirB$^{VP}$ toxin) and ORF-14 (coding gene of plasmid) that mediates the virulence of *V. parahaemolyticus* in shrimp species (Han et al., 2015; Kumar et al., 2019; Sirikharin et al., 2015) was examined. Interestingly, the expression of virulent plasmid genes was significantly downregulated in M0904/110 at 12 and 24 hours as compared with M0904/120 (FIG. 2, Panels A, B). This observation is in line with the results on secreted proteins (mentioned above) and highlights that M0904/110 culture significantly decrease the transcription of virulence genes.

Considering that in altered environmental condition, *V. parahaemolyticus* produce floccules and secrete alkaline phosphatase PhoX enzyme, the temporal expression of alkaline phosphatase PhoX genes in *V. parahaemolyticus* (M0904/110 or M0904/120) was investigated. The expression of alkaline phosphatase PhoX gene was significantly increased at 12 and 24 hours in M0904/110, when compared with the M0904/120 (FIG. 2, Panel C). Taken together, these results imply that *V. parahaemolyticus* in lower shaking condition switch its phenotype, which, in turn, leads to decreased transcription of virulence related genes and increased expression of floccules related alkaline phosphatase PhoX gene.

Figure 3:
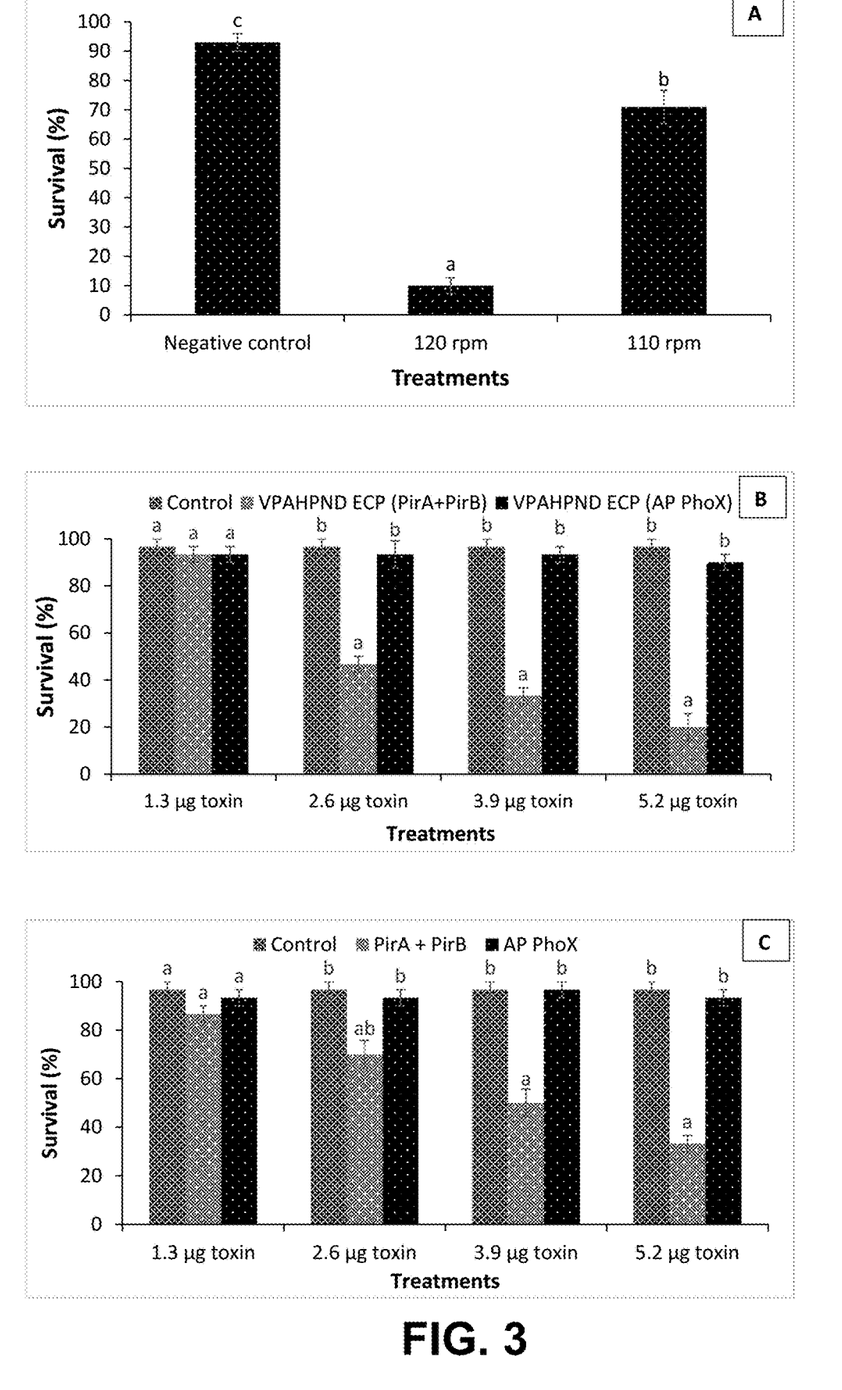
FIG. 3, Panel (A). Survival (%) of brine shrimp larvae after 48 hours of challenge with V. parahaemolyticus M0904 culture incubated overnight in 20 ml marine broth under constant agitation at 120 min$^{-1}$ or 110 min$^{-1}$. The larvae were challenged with V. parahaemolyticus at 10$^7$ cells/ml of rearing water. Non-challenged larvae were served as a negative control. Error bars represent the standard error of five replicates; different letters indicate significant differences (P<0.001).

The AHPND *Vibrio parahaemolyticus* Grown in Lower Shaking Condition Reduces the Toxicity of AHPND Strain in Brine Shrimp Larvae Since, environmental condition in *V. parahaemolyticus* culture medium plays a significant role in the expression of virulence related genes (as shown above). Next, the in vivo virulence of *V. parahaemolyticus* was investigated using gnotobiotic brine shrimp larvae, which is a good model for studying host-pathogen interaction (Baruah et al., 2017, 2015). At first, the toxicity of *V. parahaemolyticus* grown in either M0904/110 or M0904/120 on the survival of brine shrimp larvae was examined. The results showed that larvae that were challenged with M0904/110 exhibited significantly increased survival compared to the larvae challenged with M0904/120 (FIG. 3, Panel A). However, it is noteworthy to mention that virulence of *V. parahaemolyticus* AHPND strain is mediated by extracellular proteins (ECP) that mainly comprised of $PirA^{VP}$ and $PirB^{VP}$ toxins (Kumar et al., 2019) and since earlier in FIGS. 1A and 1B, shows that culture of M0904/110 results in secretion of alkaline phosphatase PhoX; whereas, the M0904/120 culture produce $PirA^{VP}$ and $PirB^{VP}$ toxins. We next investigated the toxicity of *V. parahaemolyticus* extracellular proteins ($VP_{AHPND}$ ECP) purified from M0904 culture grown in either M0904/110 or M0904/120. Interestingly, the results showed that toxicity of $VP_{AHPND}$ ECP purified from M0904/110, decreased significantly when challenged at 1.3, 2.6, 3.9 and 5.2 μg concentration as compared with $VP_{AHPND}$ ECP purified from M0904/120 culture (FIG. 3, Panel B). Although, the toxicity of $VP_{AHPND}$ ECP purified from *V. parahaemolyticus* grown in either M0904/110 or M0904/120 was significantly different, it is important to assess the toxicity of pure alkaline phosphatase PhoX as compared with pure $PirA^{VP}$ and $PirB^{VP}$ toxins. Since apart from alkaline phosphatase PhoX or $PirA^{VP}$ and $PirB^{VP}$ toxin, *V. parahaemolyticus* may also secrete some other protein or toxins that might contribute in the toxicity of ECP in brine shrimp larvae (Sirikharin et al., 2015). To do this, the purified alkaline phosphatase PhoX or $PirA^{VP}$ and $PirB^{VP}$ toxin from M0904/110 or M0904/120 was challenged to brine shrimp larvae at the concentration of 1.3, 2.6, 3.9 and 5.2 μg/100 μl. In agreement with the previous $VP_{AHPND}$ ECP survival results, the results showed that brine shrimp larvae exposed to varying concentration of pure alkaline phosphatase PhoX enzyme has significantly increased survival percentage when compared with PirA$^{VP}$ and PirB$^{VP}$ toxin (FIG. 3, Panel C). Taking these results together, our in vivo assay confirms that shaking speed indeed plays an essential role in mediating virulence of *V. parahaemolyticus* in brine shrimp larvae.

Figure 4:
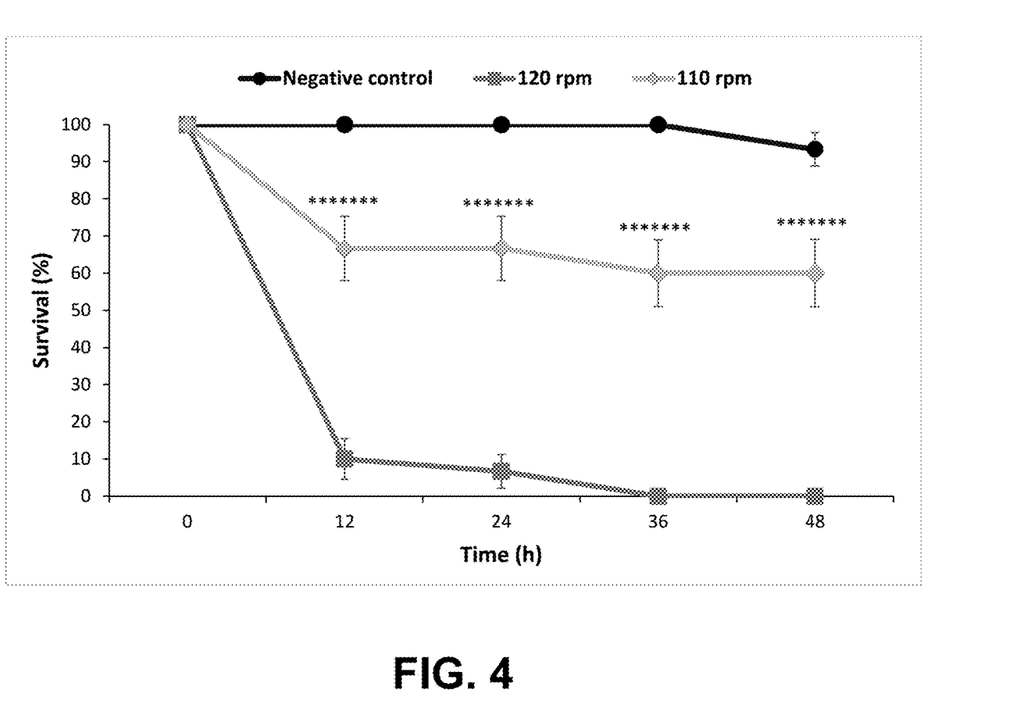
FIG. 4. Survival (%) of Macrobrachium larvae (8-days old) after 12, 24, 36 and 48 hours post challenge with V. parahaemolyticus M0904 culture incubated overnight in 20 ml marine broth (MB) under constant agitation with 120 min$^{-1}$ or 110 min$^{-1}$. The larvae were challenged with V. parahaemolyticus at 10$^6$ cells/ml of rearing water. Non-challenged larvae were served as a negative control. Values are presented as mean±SE (n=3). Asterisks represents significant difference between the treatment groups challenged with either 110 rpm or 120 rpm min$^{-1}$ M0904 culture *(P<0.05), (P<0.01), *(P<0.001), **(P<0.0001), *(P<0.00001), **(P<0.000001), *****(P<0.0000001).

Floccule Formation Decreases the Toxicity of AHPND *Vibrio parahaemolyticus* M0904 Strain in *Macrobrachium rosenbergii* Larvae Earlier in the study, it is shown that shaking speed modulates the virulence of *V. parahaemolyticus* in brine shrimp larvae. This has led to the suggestion that altered shaking speed might decrease the virulence of *V. parahaemolyticus* in other shrimp species, e.g., freshwater shrimp, *Macrobrachium rosenbergii*. To test the hypothesis, additional in vivo assay was conducted to investigate the virulence of *V. parahaemolyticus* grown in either M0904/110 or M0904/120 on survival of 8-days old *Macrobrachium* larvae. The results showed that survival of *Macrobrachium* larvae exposed to M0904/110 was significantly higher at 12, 24, 36 and 48 hours post challenge when compared with larvae challenged with M0904/120 (FIG. 4). The results were consistent with brine shrimp larvae survival results and indicate that *V. parahaemolyticus* in lower shaking condition becomes less virulent to shrimp species.

Taken together, the above-indicated results show that the alkaline phosphatase PhoX enzyme and/or the PirA$^{VP}$ and PirB$^{VP}$ toxins that are secreted by *Vibrio parahaemolyticus* can be used to determine whether the bacterium is virulent or not.

REFERENCES

1. Balaban, N. Q., Merrin, J., Chait, R., Kowalik, L., Leibler, S., 2004. Bacterial Persistence as a Phenotypic Switch. Science (80-) 305, 1622-1626.
2. Baruah, K., Cam, D. T. V, Dierckens, K., Wille, M., Defoirdt, T., Sorgeloos, P., Bossier, P., 2009. In vivo effects of single or combined N-acyl homoserine lactone quorum sensing signals on the performance of *Macrobrachium rosenbergii* larvae. Aquaculture 288, 233-238.
3. Baruah, K., Huy, T. T., Norouzitallab, P., Niu, Y., Gupta, S. K., De Schryver, P., Bossier, P., 2015. Probing the protective mechanism of poly-β-hydroxybutyrate against vibriosis by using gnotobiotic *Artemia franciscana* and *Vibrio campbellii* as host-pathogen model. Sci. Rep. 5, 1-8.
4. Baruah, K., Norouzitallab, P., Linayati, L., Sorgeloos, P., Bossier, P., 2014. Reactive oxygen species generated by a heat shock protein (Hsp) inducing product contributes to Hsp70 production and Hsp70-mediated protective immunity in *Artemia franciscana* against pathogenic vibrios. Dev. Comp. Immunol. 46, 470-479.
5. Baruah, K., Norouzitallab, P., Phong, H. P. P. D., Smagghe, G., Bossier, P., 2017. Enhanced resistance against *Vibrio harveyi* infection by carvacrol and its association with the induction of heat shock protein 72 in gnotobiotic *Artemia franciscana*. Cell Stress Chaperones 22, 377-387.
6. Baruah, K., Norouzitallab, P., Roberts, R. J., Sorgeloos, P., Bossier, P., 2012. A novel heat-shock protein inducer triggers heat shock protein 70 production and protects *Artemia franciscana* nauplii against abiotic stressors. Aquaculture 334-337, 152-158.
7. Bradford, M. M., 1976. A rapid and sensitive method for the quantitation of microgram quantities of protein utilizing the principle of protein-dye binding. Anal. Biochem. 72, 248-254.
8. Campa-Córdova, A. I., León-Gallo, A. F., Romero-Maldonado, A., Ibarra-Serrano, A. C., Rosales-Mendoza, S., Hirono, I., Angulo, C., 2017. Recombinant PirA-like toxin protects shrimp against challenge with *Vibrio parahaemolyticus*, the aetiological agent of acute hepatopancreatic necrosis disease. J. Fish Dis. 40, 1725-1729.
9. Defoirdt, T., Crab, R., Wood, T. K., Sorgeloos, P., Verstraete, W., Bossier, P., 2006. Quorum Sensing-Disrupting Brominated Furanones Protect the Gnotobiotic Brine Shrimp *Artemia franciscana* from Pathogenic *Vibrio harveyi*, *Vibrio campbellii*, and *Vibrio parahaemolyticus* Isolates †. Appl. Environ. Microbiol. 72, 6419-6423.
10. Delmulle, B. S., De Saeger, S. M. D. G., Sibanda, L., Barna-Vetro, I., Van Peteghem, C. H., 2005. Development of an immunoassay-based lateral flow dipstick for the rapid detection of aflatoxin B1 in pig feed. J. Agric. Food Chem. 53, 3364-3368.
11. Dong, X., Bi, D., Wang, H., Zou, P., Xie, G., Wan, X., Yang, Q., Zhu, Y., Chen, M., Guo, C., Liu, Z., Wang, W., Huang, J., 2017. pirABvp-Bearing *Vibrio parahaemolyticus* and *Vibrio campbellii* pathogens isolated from the Same AHPND-affected pond possess highly similar pathogenic plasmids. Front. Microbiol. 8, 1-9.
12. Freeman, D. J., Falkiner, F. R., Patrick, S., 1989. New method for detecting slime production by coagulase negative staphylococci. J. Clin. Pathol. 42, 872-874.
13. Frossard, A., Hammes, F., Gessner, M. O., 2016. Flow Cytometric Assessment of Bacterial Abundance in Soils, Sediments and Sludge. Front. Microbiol. 7, 1-8.
14. Gomez-gil, B., Soto-rodríguez, S., Lozano, R., Betancourt-lozano, M., 2014. Draft genome sequence of *Vibrio parahaemolyticus* strain M0605, which causes severe mortalities of shrimps in Mexico. Genome Announc. 2, e00055-14.
15. Hammes, F., Egli, T., 2010. Cytometric methods for measuring bacteria in water: advantages, pitfalls and applications. Anal. Bioanal. Chem. 397, 1083-1095.
16. Han, J. E., Tang, K. F. J., Tran, L. H., Lightner, D. V., 2015. *Photorhabdus* insect-related (Pir) toxin-like genes in a plasmid of *Vibrio parahaemolyticus*, the causative agent of acute hepatopancreatic necrosis disease (AHPND) of shrimp. Dis. Aquat. Organ. 113, 33-40.
17. Jayaraman, R., 2011. Phase variation and adaptation in bacteria: A "Red Queen's Race." Curr. Sci. 100, 1163-1171.
18. Jayasree, L., Janakiram, P., Madhavi, R., 2006. Characterization of *Vibrio* spp. associated with diseased shrimp from culture ponds of Andhra Pradesh (India). J. World Aquac. Soc. 37, 523-532.
19. Kumar, V., Baruah, K., Nguyen, D. V., Smagghe, G., Vossen, E., Bossier, P., 2018. Phloroglucinol mediated Hsp70 production in crustaceans: protection against *Vibrio parahaemolyticus* in *Artemia franciscana* and *Macrobrachium rosenbergii*. Front. Immunol. 9, 1091.
20. Kumar, V., Viet, D., Baruah, K., Bossier, P., 2019. Probing the mechanism of VP AHPND extracellular proteins toxicity purified from *Vibrio parahaemolyticus* AHPND strain in germ-free *Artemia* test system. Aquaculture 504, 414-419.
21. Lee, C.-T., Chen, I.-T., Yang, Y.-T., Ko, T.-P., Huang, Y.-T., Huang, J.-Y., Huang, M.-F., Lin, S.-J., Chen, C.-Y., Lin, S.-S., Lightner, D. V., Wang, Han-Ching, Wang, A. H.-J., Wang, Hao-Ching, Hor, L.-I., Lo, C.-F., 2015. The 22. Li, P., Kinch, L. N., Ray, A., Dalia, A. B., Cong, Q., Nunan, L. M., Camilli, A., Grishin, N. V., Salomon, D., Orth, K., 2017. Acute hepatopancreatic necrosis disease-causing *Vibrio parahaemolyticus* strains maintain an antibacterial type VI secretion system with versatile effector repertoires. Appl. Environ. Microbiol. 83.
23. Lin, S. J., Hsu, K. C., Wang, H. C., 2017. Structural insights into the cytotoxic mechanism of *Vibrio parahaemolyticus* PirAvp and PirBvp toxins. Mar. Drugs 15, 9-12.
24. Livak, K. J., Schmittgen, T. D., 2001. Analysis of relative gene expression data using real-time quantitative PCR and the 2-AACT method. Methods 25, 402-408.
25. Nhan, D. T., Cam, D. T. V, Wille, M., Defoirdt, T., Bossier, P., Sorgeloos, P., 2010. Quorum quenching bacteria protect *Macrobrachium rosenbergii* larvae from *Vibrio harveyi* infection. J. Appl. Microbiol. 109, 1007-1016.
26. Nunan, L., Lightner, D., Pantoja, C., Gomez-Jimenez, S., 2014. Detection of acute hepatopancreatic necrosis disease (AHPND) in Mexico. Dis. Aquat. Organ. 111, 81-86.
27. Pfaffl, M. W., 2002. Relative expression software tool (REST (C)) for group-wise comparison and statistical analysis of relative expression results in real-time PCR. Nucleic Acids Res. 30, 36e-36.
28. Phuoc, L. H., Defoirdt, T., Sorgeloos, P., Bossier, P., 2009. Virulence of luminescent and non-luminescent isogenic vibrios toward gnotobiotic *Artemia franciscana* larvae and specific pathogen-free Litopenaeus vannamei shrimp. J. Appl. Microbiol. 106, 1388-1396.
29. Rahman, M. M., Wille, M., Cavalli, R. O., Sorgeloos, P., Clegg, J. S., 2004. Induced thermotolerance and stress resistance in larvae of the freshwater prawn, *Macrobrachium rosenbergii* (de Man, 1879). Aquaculture 230, 569-579.
30. Rossignol, G., Sperandio, D., Guerillon, J., Poc, C. D., Soum-soutera, E., 2009. Phenotypic variation in the *Pseudomonas fluorescens* clinical strain MFN1032. Res. Microbiol. 160, 337-344.
31. Sirikharin, R., Taengchaiyaphum, S., Sanguanrut, P., Chi, T. D., Mavichak, R., Proespraiwong, P., Nuangsaeng, B., Thitamadee, S., Flegel, T. W., Sritunyalucksana, K., 2015. Characterization and PCR detection of binary, pir-like toxins from *vibrio parahaemolyticus* isolates that cause acute hepatopancreatic necrosis disease (AHPND) in shrimp. PLOS One 10, 1-16.
32. Sirikharin, R., Taengchaiyaphum, S., Sritunyalucksana, K., Thitamadee, S., Flegel, T. W., Mavichak, R., 2014. A new and improved PCR method for detection of AHPND bacteria 7-9.
33. Sousa, A. M., Machado, I., Pereira, M. O., 2011. Phenotypic switching: an opportunity to bacteria thrive, in: Communicating Current Research and Technological Advances. Formatex, pp. 252-262.
34. Suong, N. T., Van Hao, N., Van Sang, N., Hung, N. D., Tinh, N. T. N., Phuoc, L. H., Van Cuong, D., Luan, N. T., Phuong, D. V., Thom, T. T., Thao, P. H., Bossier, P., Sorgeloos, P., Defoirdt, T., 2017. The impact of catecholamine sensing on the virulence of *Vibrio parahaemolyticus* causing acute hepatopancreatic necrosis disease (AHPND). Aquaculture 470, 190-195.
35. Thomen, P., Robert, J., Monmeyran, A., Bitbol, A., Henry, N., 2017. Bacterial biofilm under flow: First a physical struggle to stay, then a matter of breathing. PLOS One 12, e0175197.
36. Tran, L., Nunan, L., Redman, R. M., Mohney, L. L., Pantoja, C. R., Fitzsimmons, K., Lightner, D. V., 2013. Determination of the infectious nature of the agent of acute hepatopancreatic necrosis syndrome affecting penaeid shrimp. Dis. Aquat. Organ. 105, 45-55.
37. Woude, M. W. Van Der, 2006. Re-examining the role and random nature of phase variation. FEMS Microbiol Lett 254, 190-197.

The invention claimed is:

1. A method of phenotyping *Vibrio parahaemolyticus* as non-virulent, the method comprising:
   providing a sample comprising shrimp culture water;
   utilizing antibodies or fragments thereof that bind to alkaline phosphatase Phox enzyme of *V. parahaemolyticus* to phenotype the *V. parahaemolyticus* as non-virulent; and culturing the shrimp without disease-mitigation treatment if the *V. parahaemolyticus* are phenotyped as non-virulent.

2. The method according to claim 1, whereby acute hepatopancreatic necrosis disease in shrimp is monitored.

3. An assay comprising:

antibodies or fragments thereof that bind to the alkaline phosphatase Phox enzyme of *Vibrio parahaemolyticus*.

4. A method of using the assay according to claim 3 to phenotype *V. parahaemolyticus* as non-virulent or as virulent, the method comprising: interacting the assay with a sample.

5. The assay according to claim 4, wherein the assay is a lateral flow immunochromatographic assay or an enzyme-linked immunosorbent assay.

6. A process of phenotyping *Vibrio parahaemolyticus* as non-virulent, the process comprising:

providing a sample comprising shrimp culture water;

bringing the sample into contact with antibodies or fragments thereof that bind to alkaline phosphatase Phox enzyme of *V. parahaemolyticus;* determining whether the alkaline phosphatase Phox enzyme of *V. parahaemolyticus* is present in the sample;

classifying the *V. parahaemolyticus* s non-virulent when the alkaline phosphatase Phox enzyme is present in the sample; and culturing the shrimp without disease-mitigation treatment upon classification of the *V. parahaemolyticus* as non-virulent.

7. The method according to claim 4, wherein the assay is a lateral flow immunochromatographic assay or an enzyme-linked immunosorbent assay.

* * * * *